May 3, 1955  A. L. A. FORTIER  2,707,389
PNEUMATIC DIFFERENTIAL APPARATUS
Filed Feb. 14, 1950
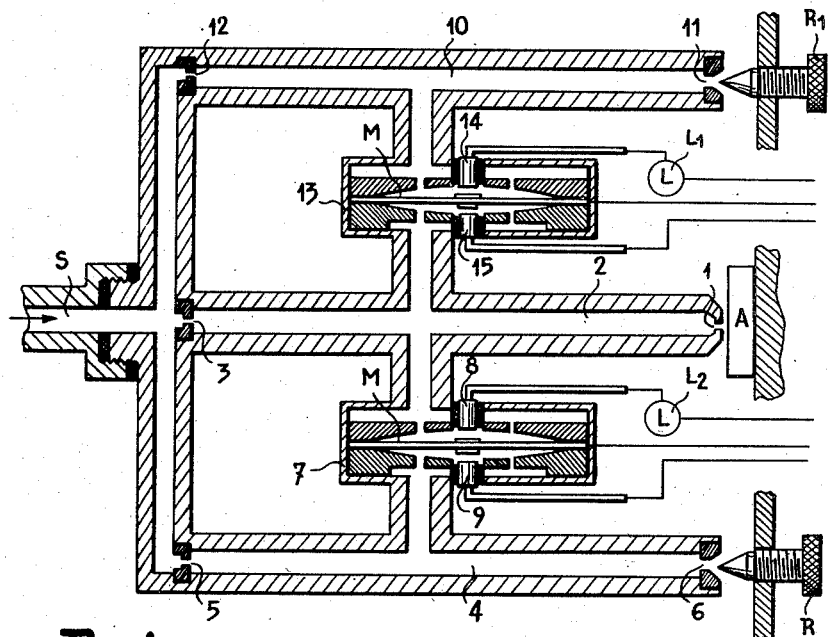
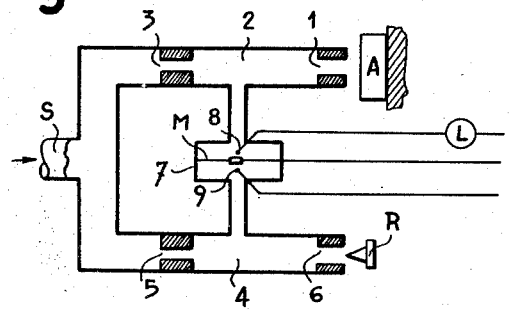
INVENTOR
Andre L.A.Fortier.
BY
ATTORNEY

United States Patent Office 2,707,389
Patented May 3, 1955

2,707,389

PNEUMATIC DIFFERENTIAL APPARATUS

André Louis Aimé Fortier, Clamart, France, assignor to Etavex S. A., Geneva, Switzerland, a corporation of Switzerland Application February 14, 1950, Serial No. 144,078

Claims priority, application Switzerland June 30, 1949

1 Claim. (Cl. 73—37.5)

The present invention has for its subject a pneumatic differential apparatus adapted to permit of the comparison of one size of a given part with a number of sizes fixed in advance.

This apparatus is distinguished from known apparatus of this type by the fact that it is provided with at least two pneumatic differential devices supplied by the same source of gaseous fluid under pressure, each provided with an adjustable orifice and co-operating with the same measuring orifice, a manometric device being interposed in shunt between the pipe for feeding the measuring orifice and each feed pipe of an adjustable orifice.

The accompanying drawing shows diagrammatically and by way of example: in Fig. 1 a diagram of a known measuring device; in Fig. 2 a diagram of a form of construction of an apparatus which forms the subject of the invention.

It is known that it is possible to measure or to control a dimension of a part by means of a pneumatic differential device of which the principle is the following with reference to the diagram of Fig. 1 of the drawing.

The part A to be controlled or measured partly closes a measuring orifice 1 located at the downflow end of a pipe 2 provided at its upflow end with a calibrated orifice 3. A pipe 4 provided at its upflow end with a calibrated orifice 5 and at its downflow end with an adjustable orifice 6, for example a needle valve R, is arranged in parallel relatively to the pipe 2. The pipes 2 and 4 are supplied by the same source with compressed air and a differential pressure responsive device 7 (copending patent application Ser. No. 772,105, filed September 4, 1947, now Patent 2,564,527, issued August 14, 1951) arranged in shunt between pipes 2 and 4 indicates by the establishment or the breaking of two electric contacts 8 or 9 the equality of pressure between the pipes 2 and 4.

For a given dimension of the part to be controlled or to be measured, that is to say for a given opening of the orifice 1, a position of a needle valve R exists for which there is equality in pressure between the pipes 2 and 4. For this position of the needle valve, the diaphragm M of the differential pressure responsive device 7 is in its position of equilibrium and the two contacts 8 and 9 are open. When the two contacts are open, the position of the needle valve R, which can be read off on a dial secured to this valve, this enables the dimension of the part to be controlled or to be measured after previous marking to be ascertained.

For a given opening of the needle valve R, when a series of parts to be controlled are passed in front of the orifice 1, it will be found that the parts having a given size corresponding with the opening given to the needle valve results in equality in pressure between the pipes 2 and 4, that is to say the opening of both contacts 8 and 9, the thick parts producing closing of the contact 9 and the thin parts the closing of contact 8.

In order that the operation of the differential device may be correct it is necessary for the diaphragm M of the differential pressure responsive device 7 to be very pliant and that its deformations never exceed the elastic limit, the contacts 8 and 9 should be very close to the position of equilibrium of the diaphragm M and, consequently, the distance between each contact 8 and 9 and the contact on the center of the diaphragm should be extremely small. For example, the diaphragm can be made so sensitive that its displacement against one or the other of contacts 8 and 9 can be effected by a deviation of the order of only one micron in the workpiece from a given standard of measurement.

But, for many applications, the size of the part to be controlled is fixed with a tolerance (10 microns for example) much greater than the difference of the size which causes the diaphragm to pass from the position 8 to the position 9. The apparatus thus enables sizes to be controlled which are extremely precise, at least spacing the contacts 8 and 9 from the position of equilibrium of the diaphragm M, which is a poor solution, as the apparatus becomes less and less accurate, in proportion to the spacing of the contacts from the position of equilibrium of the diaphragm.

The object of the present invention is to control parts with any tolerances, whilst profiting from all the advantages of the simple differential device (Patent No. 2,564,527). This result is obtained by using, no longer a differential with two branches, but a device with multiple branches enabling the size of the part to be controlled to be compared with a series of sizes fixed in advance.

An apparatus constructed according to the diagram in Fig. 2, permits of comparing the size of a given part, with two fixed sizes, limiting for example a tolerance. There is thus used a device with three branches, by arranging in parallel relatively to the pipes 2 and 4 of the simple differential device (Fig. 1) a third pipe 10 provided with a calibrated orifice 12 on the upflow and a needle valve R1 on the downflow, controlling an orifice 11. This pipe is supplied by the same source S of compressed air as the pipes 2 and 4. In shunt between the pipes 10 and 12 is placed a differential pressure responsive device 13 provided with a flexible diaphragm and two contacts 14 and 15, on opposite sides of the position of equilibrium of the diaphragm.

For two given openings of the valves R and R1 there exist two values of the size of the part A to be controlled for which the diaphragms M of the differential pressure responsive devices 7 and 13 pass respectively through their positions of equilibrium. Assuming for example that the valve R is open to a greater extent than the valve R1 then under these conditions when the part to be controlled placed in front of the orifice 1 has a size greater than the size of the adjustment of the valve R1, the diaphragm M of the differential pressure responsive device 13 is pressed against the contact 14 and the diaphragm M of the differential pressure responsive device 7 is pressed against the contact 9, when the size of the part reaches the size corresponding with the adjustment of the valve R1, the diaphragm of the differential pressure responsive device 13 leaves the contact 14 and passes through its position of equilibrium, the diaphragm of the differential pressure responsive device 7 always remains pressed against the contact 9 and this is the case when the size of the part is included between the sizes corresponding with the adjustments of the valves R and R1. Finally, when the size of the part becomes equal to the size of adjustment of the valve R, the diaphragm M of the differential pressure responsive device 7 passes through its position of equilibrium and when the size of the part becomes smaller than the size of adjustment of the valve R, the diaphragm of the differential pressure responsive device 7 is pressed against the contact 8.

Thus when the contact 14 controls for example the lighting of a red lamp L1 and the contact 8 the lighting of a green lamp L2, it will be seen that for a thick part, the red lamp L1 is lighted, for a part of which the size is within the tolerance, both lamps are extinguished and for a thin part the green lamp L2 is lighted, the lighting and extinguishing of the red and green lamps taking place when the size of the part passes through values corresponding with the limits of the tolerance.

It will be understood that the lighting and extinguishing of the two lamps of different colours is only referred to by way of example, the contacts being capable of actuating in a known manner, by means of a relay of any kind of signalling or control device of a machine tool for example.

The above description relates to a differential device with three branches and two differential pressure responsive devices which permits of comparing a size of a given part with two fixed sizes, but in reality the device may be provided with $n+1$ branches and $n$ differential pressure responsive devices, which permits of comparing the size, of a given part having $n$ sizes fixed in advance.

When for example it is desired to select parts of which the sizes extend over 10 microns of 2 by 2 microns, an apparatus is used with 7 branches and 6 differential pressure responsive devices, the needle valves of the six regulating branches being displaced by 2 by 2 microns.

I claim:

An apparatus for simultaneously gauging dimensions of an article relative to a plurality of fixed standard dimensions comprising a primary duct and a plurality of independent ducts, all of said ducts being connected to a common air inlet, each of said ducts having a calibrated inlet orifice and an outlet orifice, a valve in communication with the outlet orifice of each independent duct to vary the discharge of air through the orifice, the outlet orifice of the primary duct being adapted to be disposed in proximity to an article to be gauged, a chamber between the primary duct and each independent duct, each chamber having a flat, yieldable, elastic diaphragm of high sensitivity disposed therein and arranged as a partition of the chamber to provide two sections, means communicating the interior of one section with the primary duct and the other section with one of the independent ducts, a pair of perforated concave members in each chamber straddling and holding the rim of the diaphragm against axial movement, said concave members having a permanent fixed relationship relative to the neutral position of the diaphragm to abut and thereby limit the deformation of the diaphragm, when the center thereof is axially displaced, to a definite curvature within the elastic limit of the diaphragm, an electrical contact member carried by the diaphragm at the center thereof for axial movement therewith, a stationary electrical contact member on either side of the diaphragm projecting inwardly through the corresponding concave member in axial alignment with the center of the diaphragm, and an electrical conductor connected to each of said contact members.

References Cited in the file of this patent

UNITED STATES PATENTS

| | | |
|---|---|---|
| 2,263,335 | Heinz | Nov. 18, 1941 |
| 2,266,566 | Poole | Dec. 16, 1941 |
| 2,350,058 | May | May 30, 1944 |
| 2,390,252 | Hayward | Dec. 4, 1945 |
| 2,448,653 | Aller | Sept. 7, 1948 |
| 2,516,932 | Wainwright | Aug. 1, 1950 |
| 2,571,557 | Fortier | Oct. 16, 1951 |
| 2,589,251 | Heinz | Mar. 18, 1952 |

FOREIGN PATENTS

| | | |
|---|---|---|
| 388,265 | Great Britain | Feb. 23, 1933 |